United States Patent [19]
Gries et al.

[11] Patent Number: 5,550,828
[45] Date of Patent: Aug. 27, 1996

[54] METHOD OF HANDING OFF A COMMUNICATION UNIT IN A CELLULAR COMMUNICATION SYSTEM

[75] Inventors: Patrick J. Gries, Crystal Lake; Quoc Nguyen, Lake Zurich, both of Ill.

[73] Assignee: Motorola, Inc., Schaumburg, Ill.

[21] Appl. No.: 268,745

[22] Filed: Jun. 30, 1994

[51] Int. Cl.$^6$ ........................................... H04Q 7/36
[52] U.S. Cl. ................. 370/95.1; 370/105.1; 379/60; 455/33.2
[58] Field of Search ................. 370/17.18, 95.1, 370/95.3, 100.1, 110.1, 105.1; 379/60, 63; 455/33.1, 33.2, 33.3, 54.2, 56.1

[56] References Cited

U.S. PATENT DOCUMENTS 5,146,609  9/1992  Tayloe et al. ................... 455/33.2
5,293,380  3/1994  Kondo ............................. 370/95.3
5,444,766  8/1995  Farwell et al. ................... 379/60

Primary Examiner—Melvin Marcelo
Attorney, Agent, or Firm—Heather L. Creps

[57] ABSTRACT

The present invention provides a method of handing off a communication unit in a cellular communication system. The method includes communicating initialization frame data from a target cell transceiver to a base site transcoder; establishing communication between the target cell transceiver and the communication unit; terminating transmission of initialization frame data; communicating ordinary frame data received by the target cell transceiver from the communication unit to the base site transcoder; and handing off the communication unit to the target cell transceiver upon detecting a transition from initialization frame data to ordinary frame data at the base site transcoder.

9 Claims, 4 Drawing Sheets

5,550,828

METHOD OF HANDING OFF A COMMUNICATION UNIT IN A CELLULAR COMMUNICATION SYSTEM

RELATED INVENTION

The present invention is related to the invention disclosed in the commonly assigned co-pending U.S. patent application Ser. No. 07/912,402, filed by Stephen L. Spear and entitled "A METHOD AND APPARATUS FOR PERFORMING HANDOFFS IN A WIRELESS COMMUNICATION SYSTEM", the disclosure of which is hereby expressly incorporated herein by reference.

FIELD OF THE INVENTION

The present invention relates generally to cellular communication systems, and more particularly, to a method of handing off a communication unit in a cellular communication system.

BACKGROUND OF THE INVENTION

Cellular communication systems are known and include a number of communication cells. The cells, each of which contain a base site transceiver (BST), are linked by a base cite or base station controller (BSC) which in turn is linked to a mobile switching center (MSC) and then to the public switch telephone network (PSTN) or other mobile switching centers. A communication unit or mobile station (MS) operating within the cellular system communicates with a base site transceiver which receives and processes the data from the communication unit to the base cite controller and processes and transmits data received from the base cite controller to the communication unit. The cells cover a defined geographical area and when the communication unit travels within the cell, communication takes place solely with one cell transceiver. However, if the communication unit moves out of this cell, the cellular system must provide for transferring or handing off the communication unit from the first or source cell to a target cell, i.e., the cell where the communication unit is moving into.

Where communication has been established between a communication unit and a source cell transceiver, and the communication unit moves from the source cell to a target cell, the communication link must be reestablished through the base site transceiver of the target cell. As an aid in identifying a target cell, the communication unit typically measures signal strengths or other characteristics of signals from the surrounding cell base site transceivers. The communication unit transmits these measurements and the identity of the associated base site transceiver to the source cell transceiver. The source cell transceiver, in turn, transfers the signal strength measurements to the base site controller and the mobile switching center for evaluation and hand-off decision making.

Hand-off processing within a cellular communication system has long posed a number of problems. Namely, the user of the communication unit should not experience undue disruption or loss of service when a hand-off is made. At the same time, the communication link between the source cell transceiver and the communication unit must be broken and communication reestablished between the communication unit and a target cell transceiver in a process generally referred to as hard hand-off.

During such hand-offs, a common disruption of service is known as audio hole. Audio hole occurs when data being communicated either from or to the communication unit or from or to the cell transceiver is lost, resulting in a noticeable break in otherwise continuous communication. In voice communication, for example, audio hole may appear as a momentary discontinuity of speech. Other disruptions may be caused due to a change in communication timing between the source cell transceiver and the target cell transceiver, or due to other processing features, such as echo canceling, which must be readapted after the hand-off is completed.

A second procedure, intended to reduce the disruptions associated with hand-off is commonly referred to as "third party conference" hand-off. In a cellular system incorporating a third party conference hand-off procedure, additional transcoder circuits are provided at the base site controller to accommodate hand-off processing. Such an arrangement is shown in FIGS. 1A and 1B. During hand-off, a second transcoder is brought on-line and begins receiving and processing data from a target cell transceiver. At the same time, a transcoder still processes data received from the source cell transceiver. The data from each transcoder is summed in a three-party conference (TPC) circuit and is communicated to the mobile switching center. When communication is fully established between the target transceiver and the communication unit, the hand-off is completed and communication with the source cell transceiver is discontinued. Further communication is conducted solely through the target transceiver.

While reducing some of the disruptions associated with hand-off processing, the third party conference hand-off technique suffers the distinct disadvantage of requiring additional transcoder circuits to accomplish this purpose. These additional transcoder circuits either have to be physically added to the cellular system, which increases the cost of the system, or the capacity of the system has to be reduced to ensure an adequate supply of transcoder circuits are available for use during hand-off processing. In either case, transcoder circuits are not efficiently utilized to the benefit of the cellular system operator.

DETAILED DESCRIPTION OF THE PREFERRED EMBODIMENTS

It should be noted from the outset that the present invention is described in the following detailed description in terms of preferred embodiments. It will be readily understood by one of ordinary skill in the art that the present invention may be embodied other than as described without departing from the fair scope of its teachings With this in mind, the present invention provides a method for handing off a communication unit operating within a cellular system which, while reducing disruptions typically associated with hand-off. The present invention also reduces the number of transcoder circuits required for hand-offs and enhances transcoder circuit utilization efficiency as compared to third party conference hand-off procedures. The present invention identifies a target cell base site transceiver and establishes communication therewith via initialization frame data communicated between the target cell transceiver and the base cite transcoder. During this communication independent synchronization between the target cell transceiver and the base site transcoder, prior to a hand-off, is accomplished. The communication unit establishes communication between itself and the target cell transceiver and begins transmission of data which is then communicated as ordinary data, in place of the initialization data, to the transcoder. Receipt of ordinary data by the base site transcoder is the indication to complete hand-off since communication is established between the communication unit and the target cell transceiver.

Figures 1A, 1B:
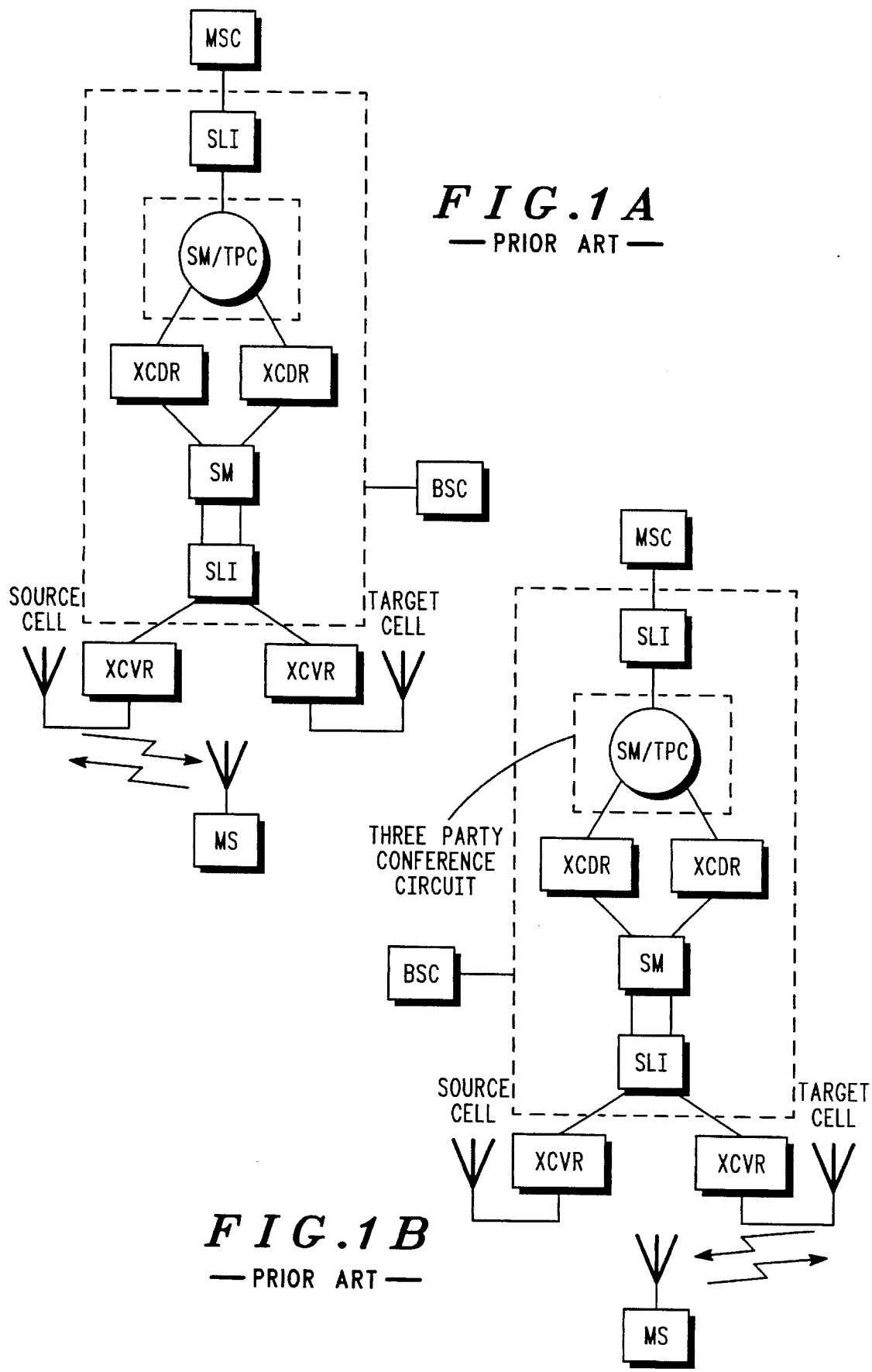
FIGS. 1A–1B illustrate a prior art third party conference hand-off of a communication unit operating in a cellular communication system.
Figure 2A:
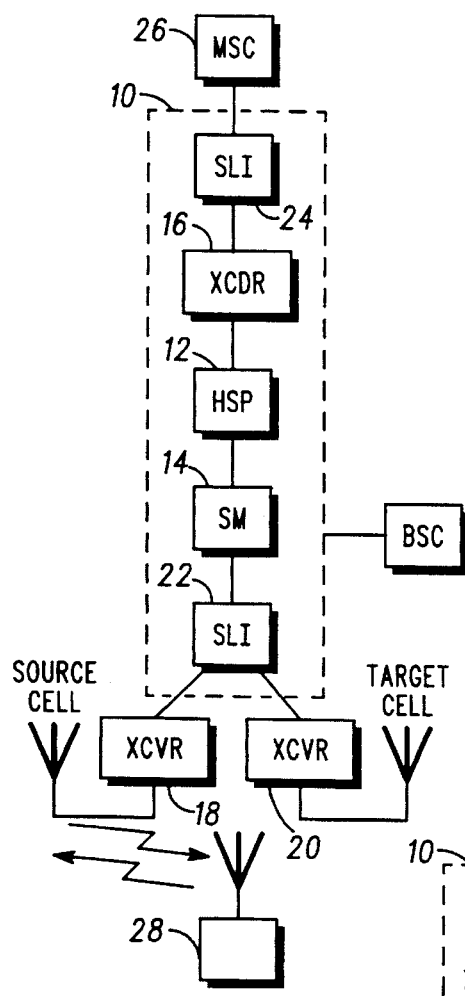
FIGS. 2A–2C illustrate a hand-off of a communication unit in accordance with a preferred embodiment of the present invention.
Figure 2B:
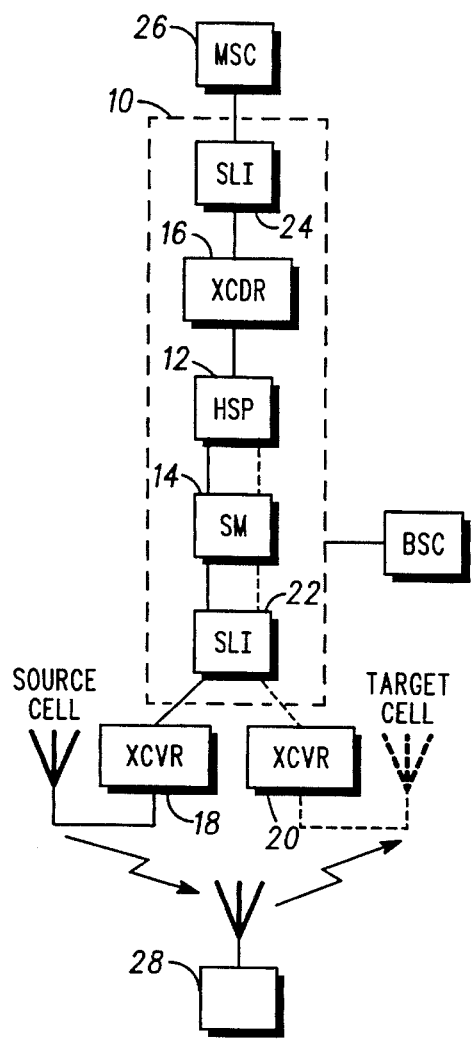
Figure 2C:
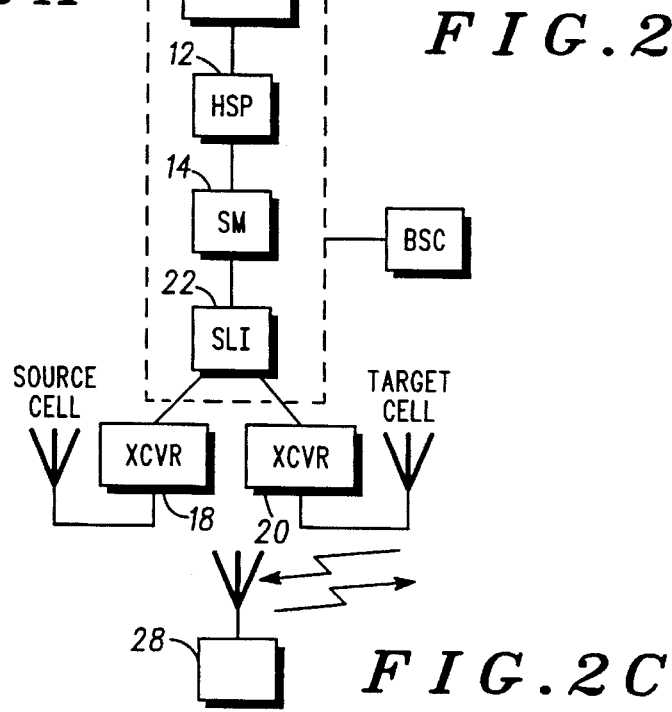

With reference to FIGS. 2A–2C, in a preferred embodiment of the present invention, a hand-off switch processor (HSP) 12 is provided and is located in communication between switching matrix 14 and the base site transcoder 16 of a cellular communication system base site controller 10. The switching matrix 14 is operable to select data from a plurality of base site transceivers including, as shown in FIGS. 2A–2C, a source base site transceiver (S-XCVR) 18 and a plurality of target base site transceivers (T-XCVRs) one of which is shown as 20, via a span line interface 22 and for communicating the selected data to HSP 12. Base site transcoder 16 further communicates via span line interface 24 to the mobile switching center 26 as is well known in the cellular communication system art.

Figure 3:
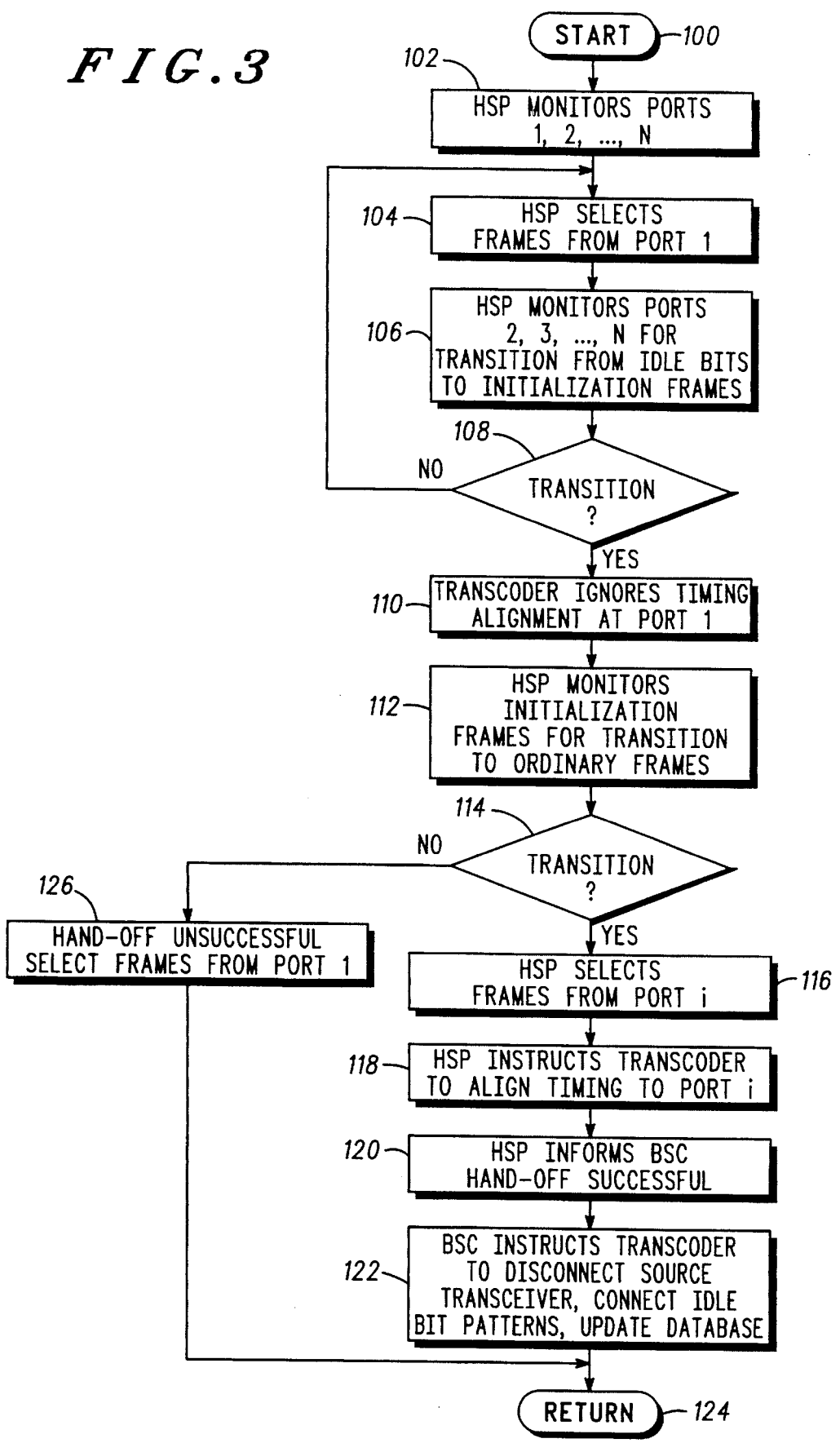
FIG. 3 is a flow chart illustrating the hand-off processing in accordance with a preferred embodiment of the present invention.

The HSP 12 is operable to monitor a plurality of communication ports which receive the selected data from S-XCVR 18 and T-XCVRs 20. As seen in FIG. 3, HSP 12 monitors ports 1, 2, ... N, 102. When a communication unit 28 initially establishes communication with S-XCVR 18, the communication channel is connected to port 1 of HSP 12. The HSP 12 selects the speech frame data (ordinary frame data) received at port 1 to communicate to the base site transcoder 16, 104, FIG. 2A. The remaining ports, 2–N, are connected by the switching matrix 14 to idle bit patterns.

As is known, communication unit 28 monitors surrounding cells of the cellular communication system and reports measured signal characteristics to the base site controller 10 and the mobile switching center 26. When either the base site controller 10 or the mobile switching center 26 determine that a hand-off is required, i.e., the signal characteristics from S-XCVR 18 has fallen below some threshold and the signal characteristics of one or more target cells exceed some threshold, the base site controller instructs the base site transcoder to connect potential T-XCVRs via switching matrix 14 to ports 2–N. When a TXCVR$_i$ is connected to the HSP 12, it begins sending initialization frame data to the HSP. As seen in FIG. 3, HSP 12 monitors ports 2–N, for a transition from idle bits to initialization frame data indicating a impending hand-off. Absent a transition to initialization frame data at ports 2–N, HSP 12 continues to select ordinary data from port 1 to communicate to the base site transcoder and to monitor ports 2–N for a transition, 108.

In a preferred embodiment of the present invention the ordinary data, for example, speech frame data, is communicated according to a CDMA protocol such as described in IS-95 or "Mobile Station-Base Station Compatibility Standard for Dual-Mode Wideband Spread Spectrum Cellular System" as well as IS-96 or "Speech Service Option Standard For Wideband Spread Spectrum Digital Cellular System" and published by the Telecommunication Industries Association (TIA), 2001 Pennsylvania Ave, N.W., Washington, D.C. 20006. It should be appreciated by those skilled in the art, however, that the principles taught herein can readily be extended to other types of communication systems and protocols such as frequency division multiple access (FDMA) and time division multiple access (TDMA) communication systems. In the present invention, ordinary data is transferred in 20 millisecond (ms) frames produced by the Supercell Transcoder/Rate Adapter Unit (STRAU frames) which are transferred at a 16 kilobits per second (kbps) rate using a modified RA1 rate adaptation format specified in CCITT V.110 as well as the RA2 rate adaptation format specified in CCITT I.460 (which are available from Comite Comsultatif International Telegraphique Et Telephonique (CCITT) now known as International Telecommunication Union—Telematic Services (ITU-TS) Place des Nations, CH 1211 Geneve 20, Switzerland). The modified RA1 rate adaptation format consists of 320 bits wherein 260 bits are used for information traffic (13 kbps), 21 (1.05 kbps) for control, 35 (1.75 kbps) for frame synchronization, and four (0.2 kbps) for time alignment.

The initialization frame data consists of STRAU hand-off synchronization frame data (STRAU-HOS frames). The STRAU frames, generally, are identified by six bits of the 21 control bits. The STRAU-HOS frames are special frames used specifically for hand-off and are distinguished from ordinary STRAU frames with a unique six bit designation. The transmission of STRAU-HOS frames by a T-XCVR$_i$ is an indication to the base site transcoder 16 that the TXCVR$_i$ has almost finished its synchronization process with the communication unit.

Once a transition from idle bit data to initialization frame data occurs, the base site transcoder can ignore further timing information received from S-XCVR 18 at port 1, 110 because timing of data at port i is independent, and thus can be adjusted independently, of timing at port 1. The HSP now monitors port i for a transition from initialization data to ordinary frame data, 112, FIG. 2B. During this time base site transcoder 16 continues to receive frame data from port 1. When the T-XCVR$_i$ has connected with the communication unit, it begins transmitting ordinary frame date in place of the initialization frame data. When the HSP 12 detects a transition from initialization data to ordinary frame data at port i, 114, the HSP 12 knows that the T-XCVR$_i$ has successfully connected to the mobile communication unit. The HSP 12 now selects port i to provide ordinary frame data to the base site transcoder 16, 116, and frame data detected at port 1 is now ignored. The HSP 12 also instructs the base site transcoder 16 to change timing and align with T-XCVR$_i$, 118. It should be noted that through out the process the output from the base site transcoder 16 has remained connected to the MSC 26, therefore functions such as echo cancellation do not have to reconverge. The HSP 12 next informs the base site controller 10 that a hand-off to T-XCVR$_i$ has occurred, 120. The base site controller 10 then instructs the base site transcoder 16 to disconnect S-XCVR 18 from port 1, to update the database redefining port i as port 1, and to connect idle bit patterns to ports 2–N, 122, FIG. 2C.

In the event that the initialization frame data does not transition to ordinary frame data, i.e., T-XCVR$_i$ does not successfully connect with communication unit 28, the hand-off is unsuccessful. The HSP 12 continues to select frame data from port 1 to communicate to the base site transcoder, 126, and the communication unit remains connected with S-XCVR 18.

As will be appreciated, each of the uplink ports 1–N, have an associated downlink port for communicating information from base site transcoder 16 to the S-XCVR 18 or T-XCVRs 20, as the case may be, and hence to the communication unit 28. The downlink timing is dependent on uplink timing, and downlink initialization frame data at port i is delayed by the timing alignment offset of uplink initialization frame data. The timing of each individual ports 1–N, however, is independent of the other ports. Therefore, during hand-off, the communication unit 28 may be assigned to any available time slot of the T-XCVR$_i$. Also, timing adjustment of the downlink data may be started before the communication unit 28 has complete its connection with the T-XCVR$_i$. Therefore, the base site transcoder 16 can finish adjustment of the downlink timing before the connection of communication unit 28 with the T-XCVR$_i$ is completed, further reducing downlink audio hole.

Figure 4:
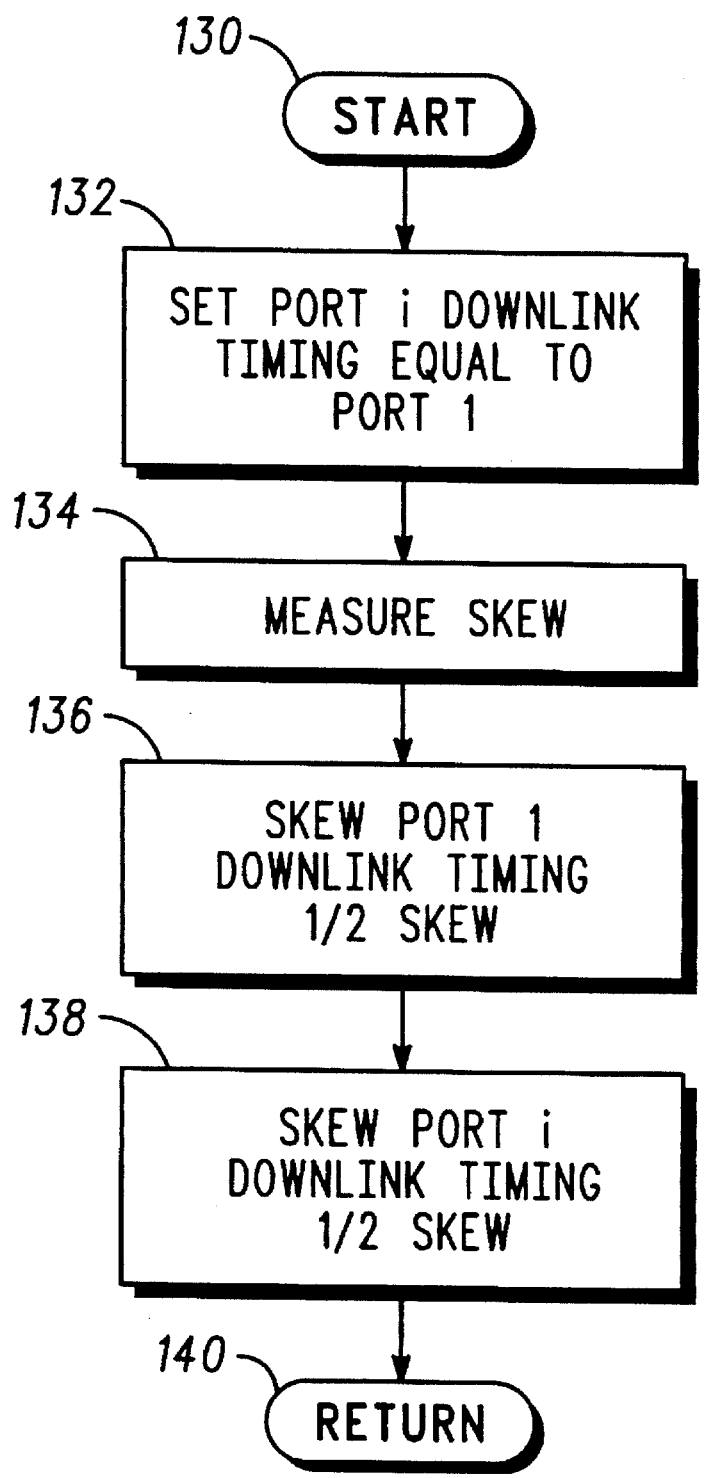
FIG. 4 is a flow chart illustrating another preferred embodiment of hand-off processing according to the present invention.

With reference now to FIG. 4 an another embodiment of the hand-off processing of the present invention is illustrated. To further enhance and advantageously utilize the independent timing capability of the present invention additional downlink timing adjustment is provided. Once initialization frame data is received at port i, the T-XCVR$_i$ downlink timing is set equal to the S-XCVR downlink timing, 132. Skew between the S-XCVR and T-XCVR$_i$ timing is determined from the timing adjustment request of the T-XCVR$_i$ upon receipt of initialization frame data, 134. That is, if the timing of the initialization frame data as received at the T-XCVR$_i$ is not correct, and which is now equal to the S-XCVR downlink timing, the T-XCVR$_i$ will request the base site transcoder 16 to correct the timing by some skew amount. The timing of the downlink port 1 timing is adjusted ½ of the skew amount, 136, and the downlink port i timing is adjusted ½ the skew amount, 138. When the hand-off is completed and the HSP 12 instructs the base site transcoder 16 to align its timing, 118, the timing will be nearer to optimum. Likewise, if the hand-off fails and the communication unit 28 returns to the S-XCVR, the timing will not have been grossly misaligned during hand-off.

The present invention has been described in terms of preferred embodiments. Those skilled in the art will readily appreciate that its teaching extend far beyond the examples presented herein and that the invention may otherwise be embodied without departing from the fair scope of its teachings.

We claim:

1. A method of handing off a radio frequency communication between a source cell transceiver and a communication unit, the method comprising the steps of:

communicating initialization frame data from a target cell transceiver to a base site transcoder;

establishing a radio frequency communication between the target cell transceiver and the communication unit, a timing of the radio frequency communication established between the target cell transceiver and the communication unit being independent of a timing of the radio frequency communication between the source cell transceiver and the communication unit;

terminating communication of initialization frame data;

communicating ordinary frame data received by the target cell transceiver from the communication unit to the base site transcoder;

detecting a transition from initialization frame data to ordinary frame data at the base site transcoder; and dropping the radio frequency communication between the source cell transceiver and the communication unit upon detecting the transition from initialization frame data to ordinary frame data at the base site transcoder.

2. The method of claim 1 wherein the step of communicating initialization frame data further comprises the step of communicating synchronization frame data.

3. A method of handing off a radio frequency communication between a source cell transceiver and a communication unit, the method comprising the steps of:

providing a hand-off switch processor in communication with the source cell transceiver, a target cell transceiver and a base site transcoder;

communicating initialization frame data from the target cell transceiver to the base site transcoder;

establishing a radio frequency communication between the target cell transceiver and the communication unit, a timing of the radio frequency communication established between the target cell transceiver and the communication unit being independent of a timing of the radio frequency communication between the source cell transceiver and the communication unit;

terminating communication of initialization frame data;

communicating ordinary frame data received by the target cell transceiver from the communication unit to the base site transcoder;

detecting a transition from initialization frame data to ordinary frame data at the base site transcoder; and dropping the radio frequency communication between the source cell transceiver and the communication unit upon detecting the transition from initialization frame data to ordinary frame data at the base site transcoder.

4. The method of claim 3 wherein the step of communicating initialization frame data further comprises the step of communicating synchronization frame data.

5. A method of performing a hand-off of a radio frequency communication between a source cell transceiver and a communication unit, the method comprising the steps of:

identifying within the cellular communication system a plurality of target cell transceivers;

transmitting initialization frame data from each of the plurality of target cell transceivers to a base site transcoder;

establishing a radio frequency communication between the communication unit and at least one of the plurality of target cell transceivers, a timing of the radio frequency communication established between the at least one of the plurality of target cell transceivers and the communication unit being independent of a timing of the radio frequency communication between the source cell transceiver and the communication unit;

communicating data from the communication unit to the at least one of the plurality of target cell transceivers;

terminating transmission of initialization data from the plurality of target cell transceivers;

transmitting the communicated data from the at least one of the plurality of target cell transceivers to the base site transcoder;

detecting a transition from initialization frame data to communicated data at the base site transcoder; and dropping the radio frequency communication between the source cell transceiver and the communication unit upon detecting the transition from the initialization frame data to the communicated data at the base site transcoder.

6. The method of claim 5 wherein the cellular communication system includes a hand-off switch processor located between and in communication with the plurality of target cell transceivers and the base site transcoder, and wherein the step of transmitting initialization frame data comprises transmitting initialization frame data to the hand-off switch processor.

7. The method of claim 6 wherein the step of handing off comprises handing off the communication unit to the at least one of the plurality of target cell transceivers upon detecting a transition from the initialization frame data to the communicated data at the hand-off switch processor.

8. A method of performing a hand-off of a radio frequency communication between a source cell transceiver and a communication unit to one of a plurality of target cell transceivers within a cellular communication system, the method comprising the steps of:

providing a hand-off switch processor located between and in communication with the source cell transceiver, the plurality of target cell transceivers and a base site transcoder;

identifying within the cellular communication system at least one of the plurality of target cell transceivers;

initiating transmission of synchronization frame data from the at least one of the plurality of target cell transceivers and the hand-off switch processor;

establishing a radio frequency communication between the communication unit and the at least one of the plurality of target cell transceivers, a timing of the radio frequency communication established between the at least one of the plurality of target cell transceivers and the communication unit being independent of a timing of the radio frequency communication between the source cell transceiver and the communication unit;

communicating data between the communication unit and the at least one of the plurality of target cell transceivers;

substituting the communicated data for the synchronization frame data being transmitted from the at least one of a plurality of target cell transceivers and the hand-off switch processor;

detecting a transition from initialization frame data to communicated data at the hand-off switch processor; and dropping the communication between the source cell transceiver and the communication unit upon detecting the transition from initialization frame data to communicated data at the hand-off switch processor.

9. The method of claim 8 further comprising the step of ignoring timing alignment signals received from the source cell transceiver upon initiating transmission of synchronization frame data.

* * * * *